Sept. 14, 1937.  O. BALK ET AL  2,093,068
MILEAGE COUNTER
Filed Aug. 14, 1933   2 Sheets-Sheet 1
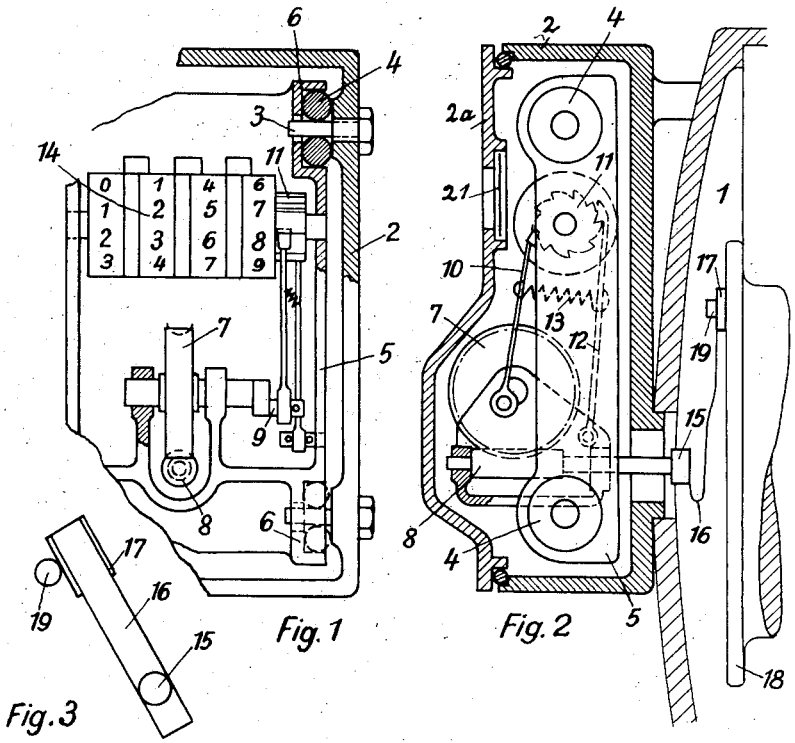
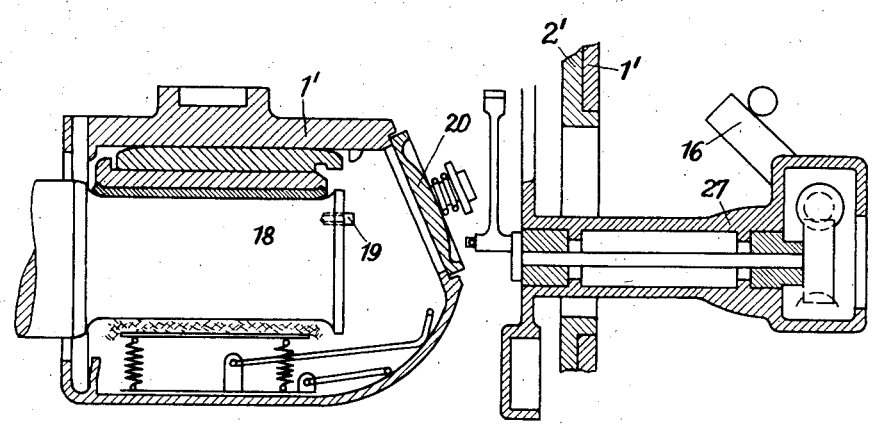
INVENTORS Sept. 14, 1937.  O. BALK ET AL  2,093,068
MILEAGE COUNTER
Filed Aug. 14, 1933  2 Sheets-Sheet 2

INVENTORS

Patented Sept. 14, 1937

2,093,068

UNITED STATES PATENT OFFICE 2,093,068

MILEAGE COUNTER

Otto Balk, Bahnhofsplatz, Munich, and Karl Bauer, Munich, Germany, assignors to Deuta-Werke vorm. Deutsche Tachometerwerke G. m. b. H., Berlin, Germany, Application August 14, 1933, Serial No. 685,060
In Germany August 17, 1931

2 Claims. (Cl. 235—95)

Mileage counters or distance meters for vehicles operating without a flexible shaft or the like driving means are known. Similar counters are also known for railway vehicles, though they have been only seldom used owing to the difficulties entailed. They have the grave drawback that the sensitive counting mechanism is exposed to innumerable vibrations and shocks due to the joints and crossings of the rails, switches and the like. These shocks are very intensive in the vertical direction to the rails and in the longitudinal direction of the vehicle axles, so that the counter fails after a short time.

This invention overcomes this drawback by a special construction of the apparatus and of its parts so as to keep the shocks and the other injurious stresses away from the counting mechanism, although the whole casing of the counter is visibly arranged on a part of the vehicle which is not supported by springs. In the present case this part is the casing of the axle bearing.

An important feature of the invention resides in a yielding or spring suspension of a frame supporting the counting mechanism in a casing fastened to the housing of the axle bearing.

Other features of the invention and details of construction will be apparent from the following description and the appended drawings.

The drawings show two embodiments of the invention.

Figs. 1 to 3 show the embodiment for vehicles with closed axle boxes. Fig. 1 is a frontal view of the open counter, and Fig. 2 is a side view with the housing in section. Fig. 3 illustrates the crank contacting with the axle pin.

Figure 5:
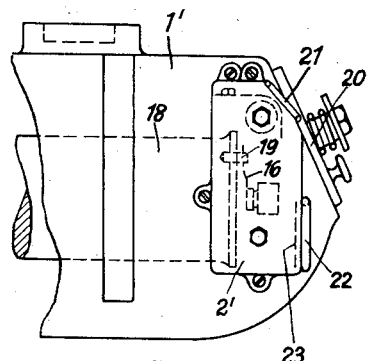
Figure 6:
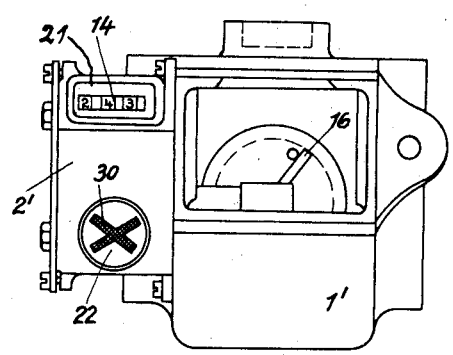
Figure 7:
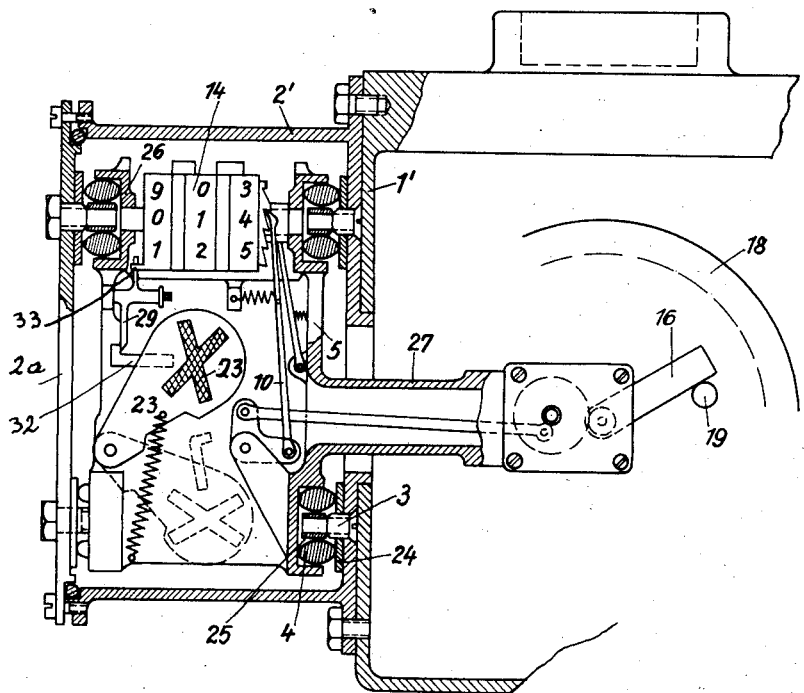

Figs. 4 to 8 illustrate an embodiment for axle bearings having on the front a rotatable cover. Fig. 4 shows this bearing in a longitudinal section, Fig. 5 is a side elevation and Fig. 6 is a front view of the bearing with a mileage counter thereon. Fig. 7 is a section along the axis of the counter. Fig. 8 shows a modified detail. Like numerals indicate like parts in all figures.

To the bearing 1 of the axle is attached in any suitable way the housing 2. In the housing 2, the frame 5 of the counter is suspended by elastic or yielding means 4. Several elastic or spring elements 4 are accommodated in the eyes 6 of the frame and are supported on the pins 3 of the housing 2, so as to afford to the frame the possibility of a yielding movement in the three principal dimensions or at least in two dimensions, id est in the direction of the axis of the vehicle and in a perpendicular direction to the rails. The counting mechanism is driven by the worm 8 and the worm-wheel 7, the ratio of which is 1:33, so that one indication occurs every 100 meters with the usual diameter of the railway wheels. The transmission of the movement of the car axle 18 onto the counting mechanism is effected by means of the crank 9 or of an eccentric, which moves the ratchet wheel 11 by means of the pawl 10. A locking hook 12 prevents undesired reverse movement of the ratchet wheel. The pawl 10 and the hook 12 are held in engagement with the ratchet wheel 11 by one or more springs 13. The ratchet wheel drives the counting wheels 14 in the known manner.

On the end of the worm wheel is fastened by means of the sleeve 15 the spring arm 16 abutting against the end face of the car axle 18 and contacting by means of the shoe 17 with the pin 19 on the said face. By these means the rotating axle drives the worm independently of the radial and axial vibrations of the axle.

The second embodiment of the invention shown in Figs. 4 to 8 is more suitable for axle bearings having a housing 1' closed by a rotatable cover 20. In this case the mileage counter is driven directly by the axle of the car. Moreover the counter can be so arranged outside of the said bearing that the indications can be readily seen. The reading of the indications of the counter from the front and from above as from a platform is further facilitated by arranging an inclined window 21 along the counting wheels of the apparatus. Apart from this window 21 a second window 22 is provided through which even from a great distance a preferably two-coloured signal 23 becomes visible when the car has traveled a predetermined distance.

To the upper or lateral wall of the axle bearing, see Fig. 6, is fastened or cast a housing 2'. Within this housing is yieldingly suspended the frame 5 of the counting mechanism 14 on the pins 3 by means of the elements 4. The insulations 24, 25 are interposed to keep the heat away from the mechanim.

On the end face of the car axle 18 is arranged a driving pin 19 contacting with the crank-arm 16 formed by a flat spring. This arm moves by means of toothed or worm wheels 34, 35, the link 36, and the knee lever 37 pivoted at 38, see Fig. 7 or 8, the pawl 10 of the counting mechanism. The frame 5 and its prolongation 27 accommodating the crank arm 16 is carried as a unit by springs or other yielding elements 4. The insulations 24, 25 ensure a long life to the elastic elements 4 as they keep away the heat developed in the axle-bearings.

The window 21 of the housing 2' is inclined at an angle of about 30° to 70° to the vertical direction so that the numerals of the counting mechanism 14 are to be easily seen looking from the front or from above the apparatus.

The signal disc 23 is normally not visible. But when the predetermined longest running way is reached by the car the releasing means 29 are freed by the counting mechanism so that the signal disc 23 appears in the window 22. This disc shows preferably a red cross 30 on a white ground so that signal is visible even from a great distance. A spring 31 tends to keep the signal disc in register with the window 22. But normally the disc is held invisible by the means 29 engaging the hook 32 in the upper position. At the end of the predetermined maximum mileage the nose 33 strikes the releasing means 29 and allows the disc to fall.

The whole apparatus is so constructed that after removing the wall 2a of the housing 2' the frame can be removed with the counting mechanism, the prolongation and the driving arm as a coherent unit without demounting any other parts.

What we claim is:

1. In combination with an axle box of a railway car, a casing rigidly secured to the outside of said axle box, a frame resiliently supported in said casing and provided with a prolongation extending into said axle box through an opening arranged in the wall thereof, a register mechanism mounted in said frame, driving means connected with said register mechanism and partly housed in said prolongation, said driving means being adapted to be rotated by the axle, and a resilient member forming a part of said driving means and being adapted to yield in the direction of the axis of the axle.

2. In combination with an axle box of a railway car, a casing rigidly secured to the outside of said axle box, a frame arranged in said casing and provided with a prolongation extending into said axle box through an opening arranged in the wall thereof, resilient means disposed between said casing and said frame, a register mechanism mounted in said frame, driving means connected with said register mechanism and partly housed in said prolongation, and including a leaf spring adapted to yield in the direction of the axis of the axle, the free end of said leaf spring being in contact with a projection eccentrically arranged on said axle.

OTTO BALK.
KARL BAUER.